(12) United States Patent
Yamamoto et al.

(10) Patent No.: US 11,938,818 B2
(45) Date of Patent: Mar. 26, 2024

(54) PERIPHERY MONITORING APPARATUS

(71) Applicant: AISIN CORPORATION, Aichi (JP)

(72) Inventors: Kinji Yamamoto, Kariya (JP); Kazuya Watanabe, Kariya (JP)

(73) Assignee: AISIN CORPORATION, Aichi (JP)

( * ) Notice: Subject to any disclaimer, the term of this patent is extended or adjusted under 35 U.S.C. 154(b) by 309 days.

(21) Appl. No.: 17/540,544

(22) Filed: Dec. 2, 2021

(65) Prior Publication Data
US 2022/0176819 A1   Jun. 9, 2022

(30) Foreign Application Priority Data

Dec. 4, 2020  (JP) ................... 2020-201562

(51) Int. Cl.
*B60K 35/00* (2006.01)
*B60R 1/00* (2022.01)

(52) U.S. Cl.
CPC ............... *B60K 35/00* (2013.01); *B60R 1/00* (2013.01); *B60K 2370/149* (2019.05); *B60K 2370/165* (2019.05); *B60K 2370/1868* (2019.05); *B60K 2370/193* (2019.05); *B60R 2300/105* (2013.01); *B60R 2300/70* (2013.01)

(58) Field of Classification Search
CPC ............. B60K 35/00; B60K 2370/165; B60K 2370/1868; B60K 2370/193; B60R 1/00; B60R 2300/105; B60R 2300/70
See application file for complete search history.

(56) References Cited

U.S. PATENT DOCUMENTS

| 7,161,616 | B1 * | 1/2007 | Okamoto ................ B60R 1/00 |
| | | | 348/E7.086 |
| 10,789,763 | B2 * | 9/2020 | Watanabe .............. B60K 35/00 |
| 2019/0221028 | A1 * | 7/2019 | Watanabe .......... B62D 15/0295 |
| 2020/0209959 | A1 * | 7/2020 | Oniwa ................... G06T 13/80 |

FOREIGN PATENT DOCUMENTS

| EP | 2410742 A1 * | 1/2012 | ............... B60R 1/00 |
| JP | 3300334 B2 | 7/2002 | |

* cited by examiner

*Primary Examiner* — Tarek Elarabi
(74) *Attorney, Agent, or Firm* — Sughrue Mion, PLLC (57) ABSTRACT

A periphery monitoring apparatus includes: a display processing unit configured to display, on a display, a peripheral image representing a virtual gaze area including a virtual gaze point viewed from a virtual viewpoint in a virtual space in which a situation in a periphery of a vehicle is reflected, based on a captured image acquired by capturing an image of the periphery of the vehicle; and a change processing unit configured to change a viewpoint radius corresponding to a distance between the virtual gaze point and the virtual viewpoint and a viewing angle corresponding to a range of the virtual gaze area viewed from the virtual viewpoint in accordance with a change in a situation on a left side or a right side in a traveling direction of the vehicle.

7 Claims, 6 Drawing Sheets

PERIPHERY MONITORING APPARATUS

CROSS REFERENCE TO RELATED APPLICATIONS

This application is based on and claims priority under 35 U.S.C. § 119 to Japanese Patent Application 2020-201562, filed on Dec. 4, 2020, the entire content of which is incorporated herein by reference.

TECHNICAL FIELD

This disclosure relates to a periphery monitoring apparatus.

BACKGROUND DISCUSSION

In the related art such as disclosed in JP3300334B2, for example, there has been known a technology of monitoring a situation in a periphery of a vehicle by using a peripheral image representing a virtual gaze area including a virtual gaze point viewed from a virtual viewpoint in a virtual space in which the situation in the periphery of the vehicle is reflected. Such a peripheral image is generated based on a captured image acquired from an imaging device provided in the vehicle in order to capture an image of the periphery of the vehicle.

In the technique as described above, when a viewpoint radius corresponding to a distance between the virtual gaze point and the virtual viewpoint and a viewing angle corresponding to a range of the virtual gaze area viewed from the virtual viewpoint are always set to be constant, it may be difficult to monitor a change in the situation on a left side or a right side in a traveling direction of the vehicle.

A need thus exists for a periphery monitoring apparatus which is not susceptible to the drawback mentioned above.

SUMMARY

A periphery monitoring apparatus as an example of this disclosure includes: a display processing unit configured to display, on a display, a peripheral image representing a virtual gaze area including a virtual gaze point viewed from a virtual viewpoint in a virtual space in which a situation in a periphery of a vehicle is reflected, based on a captured image acquired by capturing an image of the periphery of the vehicle; and a change processing unit configured to change a viewpoint radius corresponding to a distance between the virtual gaze point and the virtual viewpoint and a viewing angle corresponding to a range of the virtual gaze area viewed from the virtual viewpoint in accordance with a change in a situation on a left side or a right side in a traveling direction of the vehicle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described with reference to the drawings. Configurations of the embodiment described below and operations and effects provided by the configurations are merely examples, and are not limited to the contents described below.

Figure 1:
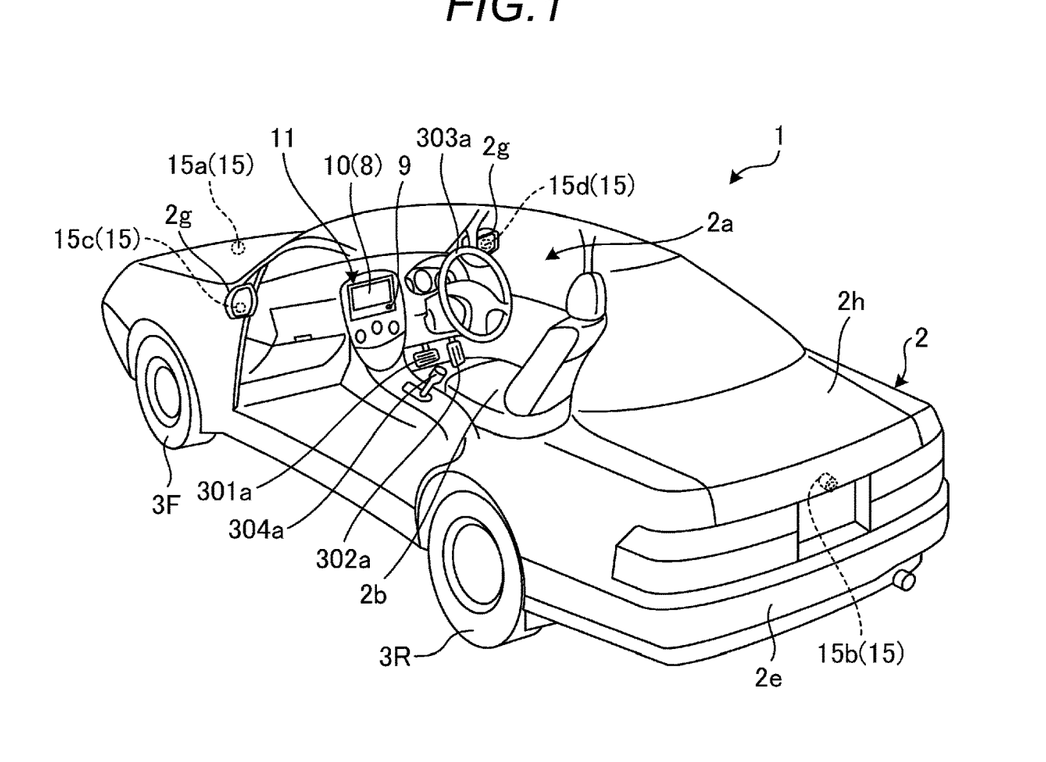
FIG. 1 is an exemplary and schematic view illustrating a configuration inside a vehicle cabin of a vehicle according to an embodiment.
Figure 2:
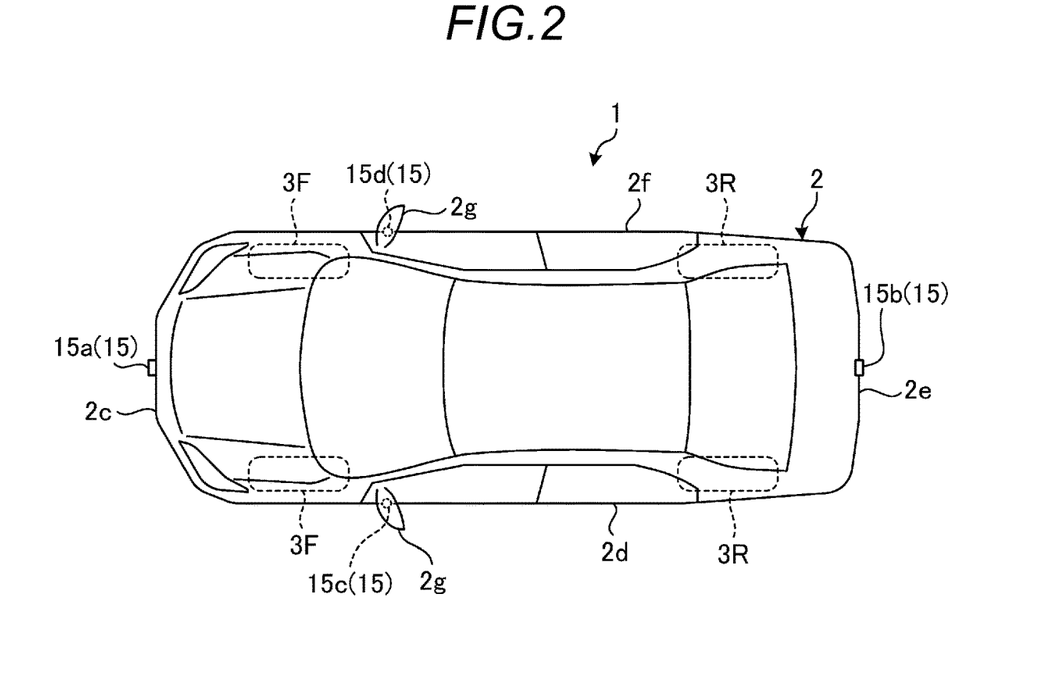
FIG. 2 is an exemplary and schematic view illustrating an appearance of the vehicle according to the embodiment as viewed from above.

First, a schematic configuration of a vehicle 1 according to the embodiment will be described with reference to FIGS. 1 and 2. FIG. 1 is an exemplary and schematic view illustrating a configuration inside a vehicle cabin 2a of the vehicle 1 according to the embodiment, and FIG. 2 is an exemplary and schematic view illustrating an appearance of the vehicle 1 according to the embodiment as viewed from above.

As illustrated in FIG. 1, the vehicle 1 according to the embodiment includes the vehicle cabin 2a in which an occupant including a driver as a user rides. A brake (a brake operation unit) 301a, an accelerator (an acceleration operation unit) 302a, a steering unit 303a, a transmission (a transmission operation unit) 304a, and the like are provided inside the vehicle cabin 2a in a state where the user can operate the units from a seat 2b.

The brake 301a is, for example, a brake pedal provided under a foot of the driver, and the accelerator 302a is, for example, an accelerator pedal provided under the foot of the driver. In addition, the steering unit 303a is, for example, a steering wheel protruding from a dashboard (an instrument panel), and the transmission 304a is, for example, a shift lever protruding from a center console. Alternatively, the steering unit 303a may be a handle.

A monitor 11 including a display 8 capable of outputting various images and an audio output unit 9 capable of outputting various sounds is provided inside the vehicle cabin 2a. The monitor 11 is provided, for example, in a central portion of the dashboard in the vehicle cabin 2a in a width direction (a left-right direction). In addition, the display 8 is, for example, a liquid crystal display (LCD) or an organic electroluminescence display (OELD).

The display 8 is provided with an operation input unit 10 on a display screen as an area in which an image is displayed. The operation input unit 10 is, for example, a touch panel capable of detecting coordinates of a position to which a pointer such as a finger or a stylus approaches (including contact). As a result, the user (driver) can visually recognize the image displayed on the display screen of the display 8, and can perform various operation inputs by performing a touch (tap) operation or the like using the pointer on the operation input unit 10.

In the embodiment, the operation input unit 10 may be various physical interfaces such as a switch, a dial, a joystick, and a push button. In addition, in the embodiment, another audio output device may be provided at a position different from the position of the monitor 11 in the vehicle cabin 2a. In this case, various kinds of audio information can be output from both the audio output unit 9 and the other audio output device. In addition, in the embodiment, the monitor 11 may be capable of displaying information on various systems such as a navigation system and an audio system.

As illustrated in FIGS. 1 and 2, the vehicle 1 according to the embodiment is a four-wheel automobile including two left and right front wheels 3F and two left and right rear wheels 3R. Hereinafter, for simplicity, the front wheels 3F and the rear wheels 3R may be collectively referred to as wheels. In the embodiment, sideslip angles of a part or all of the four wheels are changed (turned) in accordance with an operation of the steering unit 303a or the like.

Furthermore, the vehicle 1 is mounted with a plurality of (four in the example illustrated in FIGS. 1 and 2) in-vehicle cameras 15a to 15d as imaging devices for monitoring the periphery. The in-vehicle camera 15a is provided at an end 2c on a front side of a vehicle body 2 (for example, front bumper), and captures an image of an area in front of the vehicle 1. The in-vehicle camera 15b is provided at an end 2e on a rear side of the vehicle body 2 (for example, below a door 2h of a rear trunk), and captures an image of an area behind the vehicle 1. The in-vehicle camera 15c is provided at a door mirror 2g at an end 2d on a left side of the vehicle body 2, and captures an image of an area on the left side of the vehicle 1. In addition, the in-vehicle camera 15d is provided at a door mirror 2g at an end 2f on a right side of the vehicle body 2, and captures an image of an area on the right side of the vehicle 1. Hereinafter, for simplicity, the in-vehicle cameras 15a to 15d may be collectively referred to as an in-vehicle camera 15.

The in-vehicle camera 15 is, for example, a so-called digital camera including an imaging device such as a charge coupled device (CCD) or a complementary metal oxide semiconductor (CMOS) image sensor (CIS). The in-vehicle camera 15 captures an image of the periphery of the vehicle 1 at a predetermined frame rate, and outputs image data of the captured image. The image data obtained by the in-vehicle camera 15 can constitute a moving image as a frame image.

Next, a system configuration provided to realize various kinds of control in the vehicle 1 according to the embodiment will be described with reference to FIG. 3. In addition, the system configuration illustrated in FIG. 3 is merely an example, and can be set (changed) in various ways.

Figure 3:
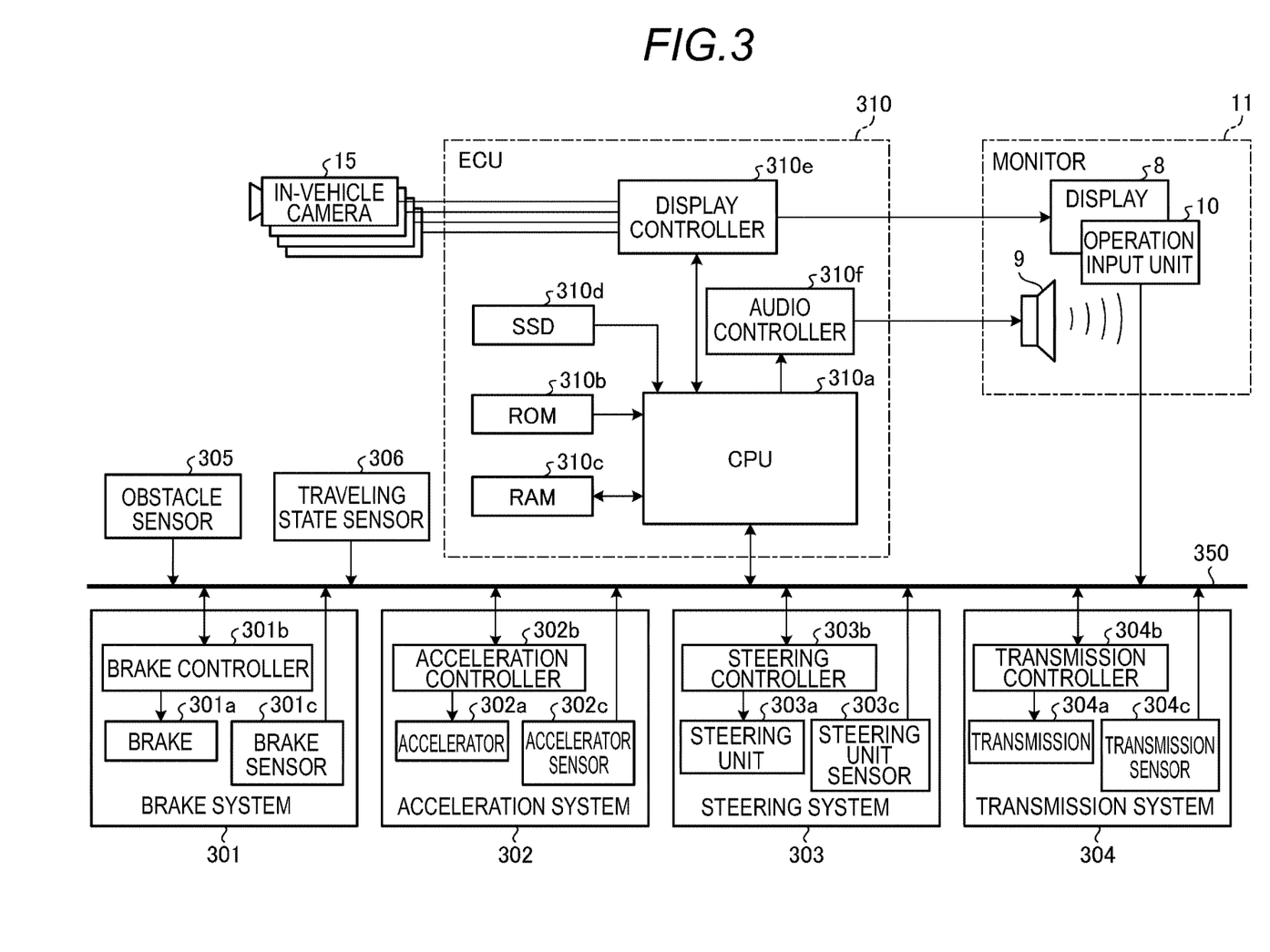
FIG. 3 is an exemplary and schematic block diagram illustrating a system configuration of the vehicle according to the embodiment.

FIG. 3 is an exemplary and schematic block diagram illustrating the system configuration of the vehicle 1 according to the embodiment. As illustrated in FIG. 3, the vehicle 1 according to the embodiment includes a brake system 301, an acceleration system 302, a steering system 303, a transmission system 304, an obstacle sensor 305, a traveling state sensor 306, the in-vehicle camera 15, the monitor 11, an electronic control unit (ECU) 310, and an in-vehicle network 350.

The brake system 301 controls deceleration of the vehicle 1. The brake system 301 includes the brake 301a, a brake controller 301b, and a brake sensor 301c.

The brake 301a is a device for decelerating the vehicle 1, such as the brake pedal described above.

The brake controller 301b is, for example, a microcomputer including a hardware processor such as a central processing unit (CPU). The brake controller 301b drives an actuator (not illustrated) based on, for example, an instruction input via the in-vehicle network 350 to operate the brake 301a, and thus controls a degree of deceleration of the vehicle 1.

The brake sensor 301c is a sensing device for detecting a state of the brake 301a. For example, when the brake 301a is a brake pedal, the brake sensor 301c detects a position of the brake pedal or a pressure acting on the brake pedal as the state of the brake 301a. The brake sensor 301c outputs the detected state of the brake 301a to the in-vehicle network 350.

The acceleration system 302 controls acceleration of the vehicle 1. The acceleration system 302 includes an accelerator 302a, an acceleration controller 302b, and an accelerator sensor 302c.

The accelerator 302a is a device for accelerating the vehicle 1, such as the accelerator pedal described above.

The acceleration controller 302b is, for example, a microcomputer including a hardware processor such as a CPU. The acceleration controller 302b drives the actuator (not illustrated) based on, for example, an instruction input via the in-vehicle network 350 to operate the accelerator 302a, and thus controls a degree of acceleration of the vehicle 1.

The accelerator sensor 302c is a sensing device for detecting a state of the accelerator 302a. For example, when the accelerator 302a is an accelerator pedal, the accelerator sensor 302c detects a position of the accelerator pedal or a pressure acting on the accelerator pedal. The accelerator sensor 302c outputs the detected state of the accelerator 302a to the in-vehicle network 350.

The steering system 303 controls a traveling direction of the vehicle 1. The steering system 303 includes a steering unit 303a, a steering controller 303b, and a steering unit sensor 303c.

The steering unit 303a is a device that turns steered wheels of the vehicle 1, such as the steering wheel or handle described above.

The steering controller 303b is, for example, a microcomputer including a hardware processor such as a CPU. The steering controller 303b drives the actuator (not illustrated) based on, for example, an instruction input via the in-vehicle network 350 to operate the steering unit 303a, and thus controls the traveling direction of the vehicle 1.

The steering unit sensor 303c is a sensing device for detecting a state of the steering unit 303a, that is, a steering angle sensor for detecting a steering angle of the vehicle 1. For example, when the steering unit 303a is a steering wheel, the steering unit sensor 303c detects a position of the steering wheel or a rotation angle of the steering wheel. Further, when the steering unit 303a is a handle, the steering unit sensor 303c may detect a position of the handle or a pressure acting on the handle. The steering unit sensor 303c outputs the detected state of the steering unit 303a to the in-vehicle network 350.

The transmission system 304 controls a transmission ratio of the vehicle 1. The transmission system 304 includes a transmission 304a, a transmission controller 304b, and a transmission sensor 304c.

The transmission 304a is a device for changing the transmission ratio of the vehicle 1, such as the shift lever described above.

The transmission controller 304b is, for example, a computer including a hardware processor such as a CPU. The transmission controller 304b drives the actuator (not illustrated) based on, for example, an instruction input via the in-vehicle network 350 to operate the transmission 304a, and thus controls the transmission ratio of the vehicle 1.

The transmission sensor 304c is a sensing device for detecting a state of the transmission 304a. For example, when the transmission 304a is a shift lever, the transmission sensor 304c detects a position of the shift lever or a pressure acting on the shift lever. The transmission sensor 304c outputs the detected state of the transmission 304a to the in-vehicle network 350.

The obstacle sensor 305 is a sensing device for detecting information on an object (obstacle) present in the periphery of the vehicle 1. The obstacle sensor 305 includes, for example, a distance measuring sensor that acquires a distance to an object present in the periphery of the vehicle 1. The distance measuring sensor includes, for example, a sonar that acquires a distance by transmitting an audio wave and receiving the audio wave reflected by the object present in the periphery of the vehicle 1, a laser radar that acquires a distance by transmitting a radio wave such as light and receiving the radio wave reflected by the object present in the periphery of the vehicle 1, and the like. The obstacle sensor 305 outputs the detected information to the in-vehicle network 350.

The traveling state sensor 306 is a device for detecting a traveling state of the vehicle 1. The traveling state sensor 306 includes, for example, a wheel speed sensor that detects a wheel speed of the vehicle 1, an acceleration sensor that detects an acceleration of the vehicle 1 in a front-rear direction or a left-right direction, a gyro sensor that detects a turning speed (angular velocity) of the vehicle 1, and the like. The traveling state sensor 306 outputs the detected traveling state to the in-vehicle network 350.

The ECU 310 is a device that integrally controls various systems provided in the vehicle 1. Details will be described later, and the ECU 310 according to the embodiment has a function of generating a peripheral image representing a situation in the periphery of the vehicle 1 based on the image data as an imaging result by the in-vehicle camera 15, and displaying the generated peripheral image on the display 8. The peripheral image is, for example, a three-dimensional image representing a virtual gaze area including a virtual gaze point viewed from a virtual viewpoint in a virtual space in which the situation in the periphery of the vehicle is reflected (a specific example will be described later). In addition, the peripheral image may include, in addition to the three-dimensional image, an overhead view image obtained by viewing the situation in the periphery of the vehicle 1 from above in an overhead view, a single-camera image that is an image based on only one piece of image data acquired from one in-vehicle camera 15, and the like.

The ECU 310 is a microcomputer including a central processing unit (CPU) 310a, a read only memory (ROM) 310b, a random access memory (RAM) 310c, a solid state drive (SSD) 310d, a display controller 310e, and an audio controller 310f.

The CPU 310a is a hardware processor that integrally controls the ECU 310. The CPU 310a reads various control programs (computer programs) stored in the ROM 310b or the like, and realizes various functions in accordance with instructions defined in the various control programs. The various control programs mentioned here include a periphery monitoring program for realizing a periphery monitoring process of outputting the above peripheral image to the display 8.

The ROM 310b is a non-volatile main storage that stores parameters and the like necessary for executing the various control programs described above.

The RAM 310c is a volatile main storage that provides a work area for the CPU 310a.

The SSD 310d is a rewritable non-volatile auxiliary storage. Further, the ECU 310 according to the embodiment may be provided with a hard disk drive (HDD), as an auxiliary storage, instead of the SSD 310d (or in addition to the SSD 310d).

The display controller 310e mainly controls image processing on a captured image obtained from the in-vehicle camera 15, generation of image data to be output to the display 8 of the monitor 11, and the like among various kinds of processing that can be executed by the ECU 310.

The audio controller 310f mainly controls generation of audio data to be output to the audio output unit 9 of the monitor 11 among various kinds of processing that can be executed by the ECU 310.

The in-vehicle network 350 connects the brake system 301, the acceleration system 302, the steering system 303, the transmission system 304, the obstacle sensor 305, the traveling state sensor 306, the operation input unit 10 of the monitor 11, and the ECU 310 to allow communication therebetween.

A technique of monitoring the situation in the periphery of the vehicle 1 by using the peripheral image such as the three-dimensional image described above have been studied for some time, but in such a technique, when a viewpoint radius corresponding to a distance between a virtual gaze point and a virtual viewpoint and a viewing angle corresponding to a range of a virtual gaze area viewed from a virtual viewpoint are always set to be constant, it may be difficult to monitor a change in the situation on the left side or the right side in the traveling direction of the vehicle 1.

Figure 4:
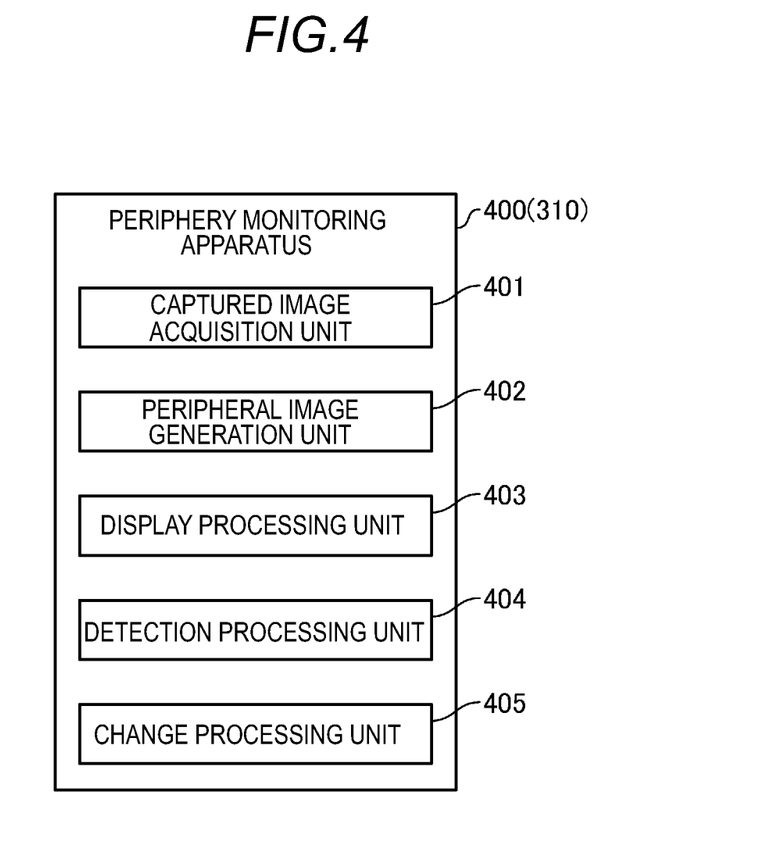
FIG. 4 is an exemplary and schematic block diagram illustrating functions of a periphery monitoring apparatus according to the embodiment.

Therefore, in the embodiment, the change in the situation on the left side or the right side in the traveling direction of the vehicle 1 can be easily monitored by realizing the periphery monitoring apparatus 400 having functions illustrated in FIG. 4 in the ECU 310.

FIG. 4 is an exemplary and schematic block diagram illustrating functions of the periphery monitoring apparatus 400 according to the embodiment.

The functions illustrated in FIG. 4 are realized in the ECU 310 by cooperation of software and hardware. That is, the functions illustrated in FIG. 4 are realized as a result of the CPU 310a of the ECU 310 reading and executing the periphery monitoring program stored in the ROM 310b or the SSD 310d. Furthermore, in the embodiment, at least a part of the functions illustrated in FIG. 4 may be realized by dedicated hardware (circuit).

As illustrated in FIG. 4, the periphery monitoring apparatus 400 according to the embodiment includes a captured image acquisition unit 401, a peripheral image generation unit 402, a display processing unit 403, a detection processing unit 404, and a change processing unit 405.

The captured image acquisition unit 401 acquires a captured image from the in-vehicle camera 15. The peripheral image generation unit 402 generates, for example, a peripheral image as in an example illustrated in FIG. 5 based on the captured image acquired by the captured image acquisition unit 401, and the display processing unit 403 outputs the peripheral image to the display 8.

Figure 5:
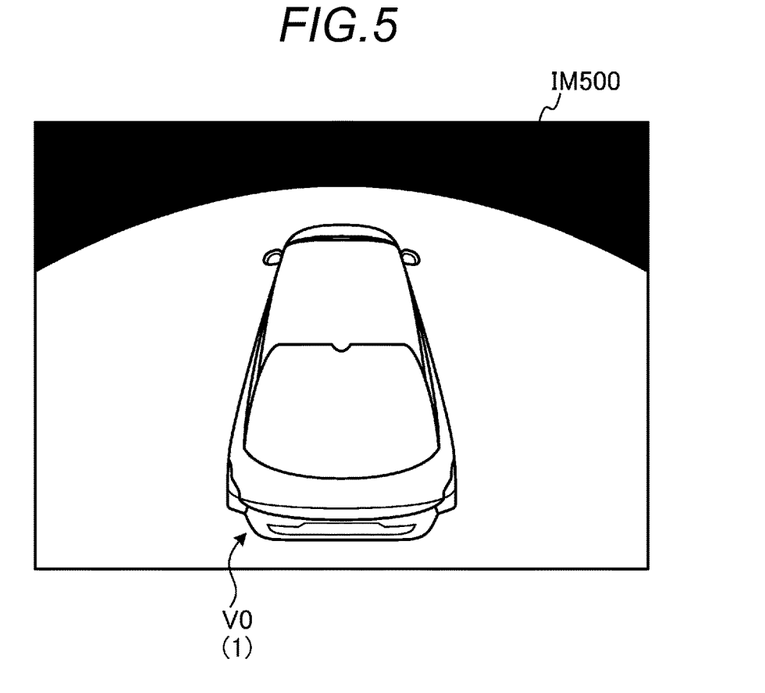
FIG. 5 is an exemplary and schematic diagram illustrating an example of a peripheral image according to the embodiment.

FIG. 5 is an exemplary and schematic diagram illustrating an example of a peripheral image according to the embodiment.

In the example illustrated in FIG. 5, an image IM500 is an example of the three-dimensional image described above as the peripheral image. In the image IM500, the situation in the periphery of the vehicle 1 is three-dimensionally displayed together with a vehicle image V0 representing the vehicle 1 at a predetermined viewpoint and a predetermined field of view. The image IM500 can be generated by setting various viewpoint parameters in a virtual space obtained by projecting the captured image onto a bowl-shaped or cylindrical model.

Figure 6:
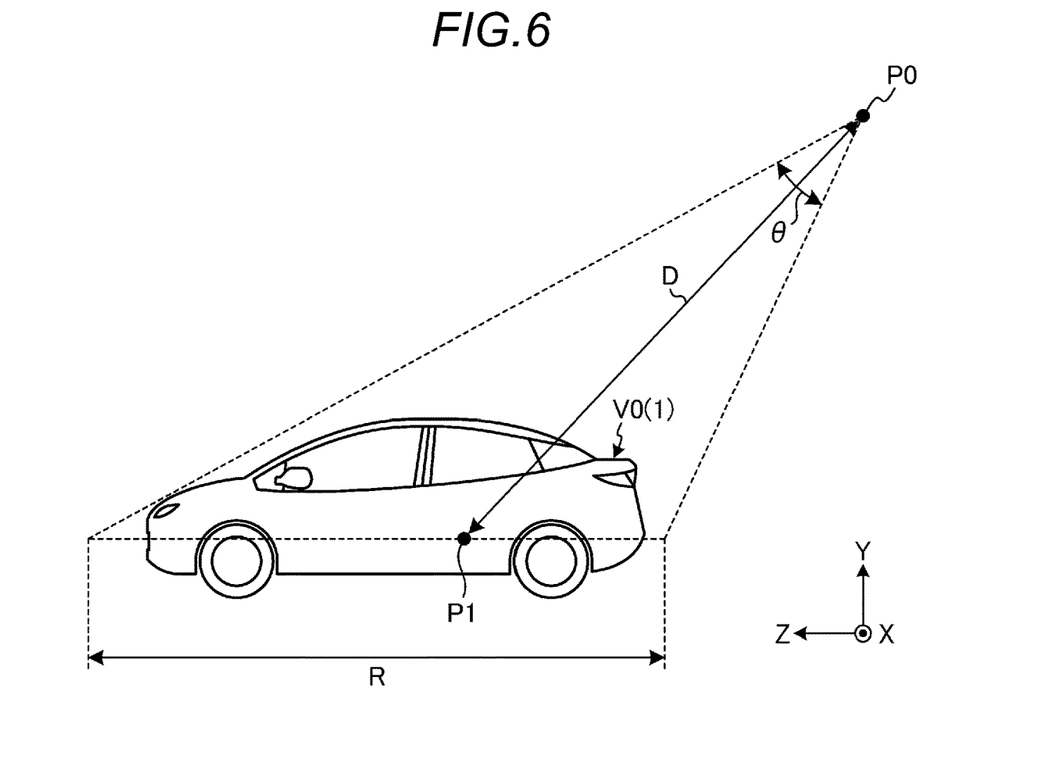
FIG. 6 is an exemplary and schematic diagram illustrating viewpoint parameters according to the embodiment.

As illustrated in FIG. 6, the viewpoint parameters according to the embodiment include coordinates of the virtual viewpoint and the virtual gaze point in the virtual space, the viewpoint radius corresponding to the distance between the virtual viewpoint and the virtual gaze point, the viewing angle corresponding to a range of a virtual parking area viewed from the virtual viewpoint, and the like.

FIG. 6 is an exemplary and schematic diagram illustrating the viewpoint parameters according to the embodiment.

In the example illustrated in FIG. 6, a point P0 and a point P1 respectively correspond to a virtual viewpoint and a virtual gaze point in a virtual space in which a predetermined coordinate system is set. FIG. 6 illustrates, as an example, a virtual space in which an XYZ coordinate system, which includes an X axis extending in a horizontal direction from a right side to a left side of the vehicle image V0, a Y axis extending in a vertical direction from a lower side to an upper side of the vehicle image V0, and a Z axis extending in the horizontal direction from a rear side to a front side of the vehicle image V0, is set.

In the embodiment, for example, the viewpoint radius as a distance D between the point P0 and the point P1, a horizontal angle indicating an angle of the point P0 with respect to the horizontal direction with the point P1 as a basis, and a vertical angle indicating the angle of the point P0 with respect to the vertical direction with the point P1 as a basis are set as the viewpoint parameters, and as a result, the coordinates of the point P0 and the point P1 in the virtual space are set. In addition, in the embodiment, the viewpoint radius, the horizontal angle, and the vertical angle may be set by setting the coordinates of the point P0 and the point P1 in the virtual space as the viewpoint parameters.

In the example illustrated in FIG. 6, an angle θ corresponds to the viewing angle from the virtual viewpoint. In the embodiment, when the angle θ is set as the viewpoint parameter, a range of a virtual gaze area R including the point P1 which is the virtual gaze point viewed from the point P0 which is the virtual viewpoint, is determined as a range to be reflected in the peripheral image.

As described above, when the viewpoint radius and the viewing angle are always set to be constant, it may be difficult to monitor the change in the situation on the left side or the right side in the traveling direction of the vehicle 1. For example, in a situation where the vehicle 1 passes a three-dimensional object such as another vehicle, it is desirable to appropriately change the viewpoint radius and the viewing angle so as to emphasize a left-right sense of distance with respect to the vehicle 1 on the peripheral image as compared with a case where there is no three-dimensional object.

Referring back to FIG. 4, the detection processing unit 404 detects the situation on the left side or the right side in the traveling direction of the vehicle 1 based on outputs of various sensors (see FIG. 3) mounted on the vehicle 1. The change processing unit 405 dynamically changes the viewpoint radius and the viewing angle of the peripheral image output to the display 8 by the display processing unit 403 according to a result of the detection by the detection processing unit 404, that is, the change in the situation on the left side or the right side in the traveling direction of the vehicle 1.

Specifically, the change processing unit 405 determines whether a degree to which the left-right sense of distance with respect to the vehicle 1 is to be emphasized on the peripheral image is higher than a current situation in accordance with the result of the detection by the detection processing unit 404. Further, when it is determined that the degree to which the left-right sense of distance with respect to the vehicle 1 is to be emphasized on the peripheral image is higher than the current degree, the change processing unit 405 changes the viewpoint radius to be larger than a current viewpoint radius and changes the viewing angle to be smaller than a current viewing angle. Hereinafter, for convenience of description, a situation before the viewpoint radius and the viewing angle are changed may be referred to as a first situation, and a situation after the viewpoint radius and the viewing angle are changed may be referred to as a second situation.

For example, when a three-dimensional object is detected on the left side or the right side in the traveling direction of the vehicle 1 under the first situation, the change processing unit 405 determines that the situation on the left side or the right side in the traveling direction of the vehicle 1 changes from the first situation to the second situation. In this case, the change processing unit 405 changes the viewpoint radius to a second viewpoint radius larger than a first viewpoint radius used in the first situation, and changes the viewing angle to a second viewing angle smaller than a first viewing angle used in the first situation.

In addition, when a movement of the vehicle 1 is detected under the first situation, the change processing unit 405 determines that the situation on the left side or the right side in the traveling direction of the vehicle 1 changes from the first situation to the second situation, and changes the viewpoint radius and the viewing angle as described above. Furthermore, when a change in the steering angle of the vehicle 1 equal to or larger than a predetermined value is detected under the first situation, the change processing unit 405 determines that the situation on the left side or the right side in the traveling direction of the vehicle 1 changes from the first situation to the second situation, and changes the viewpoint radius and the viewing angle as described above.

Figure 7:
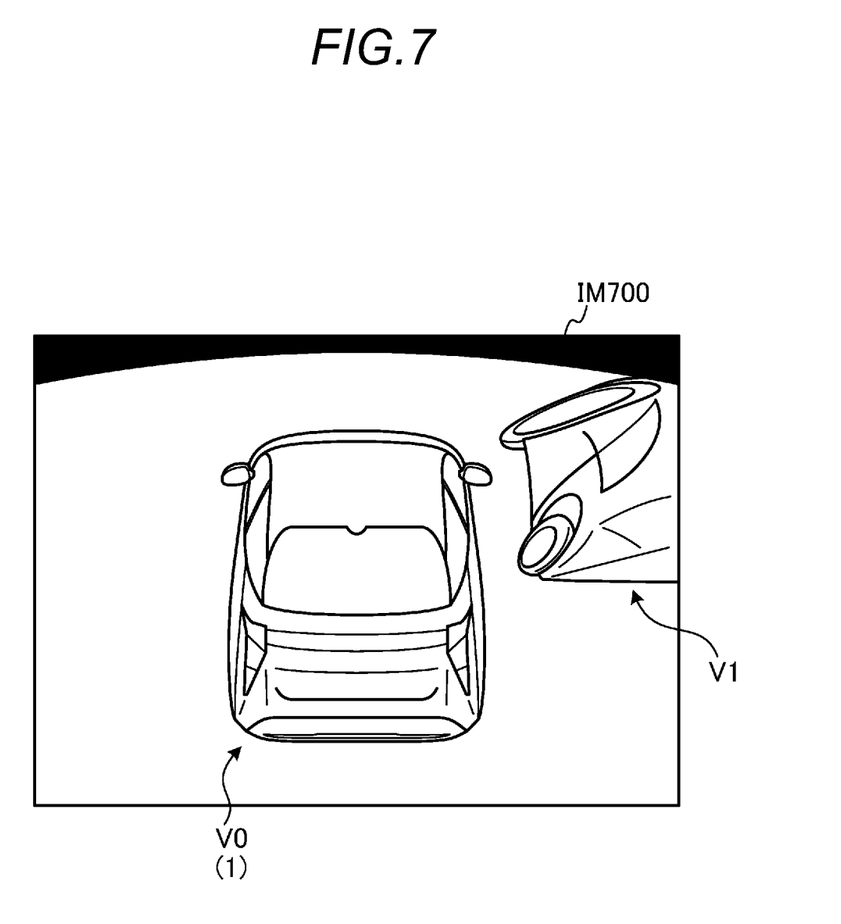
FIG. 7 is an exemplary and schematic diagram illustrating another example of the peripheral image according to the embodiment.

In view of the above, when the situation illustrated in FIG. 5 where there is no three-dimensional object on either the left side or the right side in the traveling direction of the vehicle 1 is changed to a situation where there is a three-dimensional object on the left side or the right side in the traveling direction of the vehicle 1, the peripheral image output by the display processing unit 403 is changed, for example, as in an example illustrated in FIG. 7.

FIG. 7 is an exemplary and schematic diagram illustrating another example of the peripheral image according to the embodiment.

An image IM700 illustrated in FIG. 7 is an example of the peripheral image (a three-dimensional image) that is switched from the image IM500 illustrated in FIG. 5 in accordance with the above change in the viewpoint radius and the viewing angle by the change processing unit 405 and is output to the display 8. In the image IM700, the situation in the periphery of the vehicle 1 is three-dimensionally displayed, together with the vehicle image V0 representing the vehicle 1 and a vehicle image V1 representing another vehicle as a three-dimensional object present on the right side in the traveling direction of the vehicle 1, in a field of view narrower than that of the example illustrated in FIG. 5 from a viewpoint farther than that of the example illustrated in FIG. 5. Accordingly, in the image IM700 illustrated in FIG. 7, the left-right sense of distance with respect to the vehicle 1 to be focused when the vehicle 1 and another vehicle pass each other is more easily understood than in the example illustrated in FIG. 5.

In this way, according to the embodiment, it is possible to provide a peripheral image in which the left-right sense of distance with respect to the vehicle 1 is easily understood depending on the situation.

In the above description, a situation where the viewpoint radius is increased and the field of view is narrowed is exemplified in order to make it easy to understand the left-right sense of distance with respect to the vehicle 1. However, it may be appropriate to decrease the viewpoint radius and increase the field of view depending on the situation. For example, in a state where the vehicle 1 is stopped, in particular, in a state before the vehicle 1 is started, it may be appropriate to monitor a wider range from a closer viewpoint.

Therefore, in the embodiment, when the vehicle is stopped, the change processing unit 405 may set the viewpoint radius to a third viewpoint radius equal to or smaller than the first viewpoint radius used in the first situation, and set the viewing angle to a third viewing angle equal to or larger than the first viewing angle used in the first situation.

In addition, in the embodiment, frequent changes in the viewpoint radius and viewing angle will result in frequent changes in the peripheral image. Further, when the peripheral image frequently changes, it is difficult to monitor the periphery by using the peripheral image. Therefore, in the embodiment, the change processing unit 405 may maintain the viewpoint radius and the viewing angle until a predetermined time elapses after the viewpoint radius and the viewing angle are changed.

In addition, in the embodiment, when the viewpoint radius and the viewing angle are changed, a configuration in which the peripheral image is gradually changed is more intuitively understood than a configuration in which the peripheral image is greatly changed at a time. Therefore, in the embodiment, the display processing unit 403 can gradually change the peripheral image by animation in accordance with the change in the viewpoint radius and the viewing angle by the change processing unit 405.

In addition, in the embodiment, an interval to the detected three-dimensional object may be considered when the viewpoint radius and the viewing angle are changed. That is, in the embodiment, the change processing unit 405 may change a degree of the change in the viewpoint radius and the viewing angle in accordance with the distance to the detected three-dimensional object.

Figure 8:
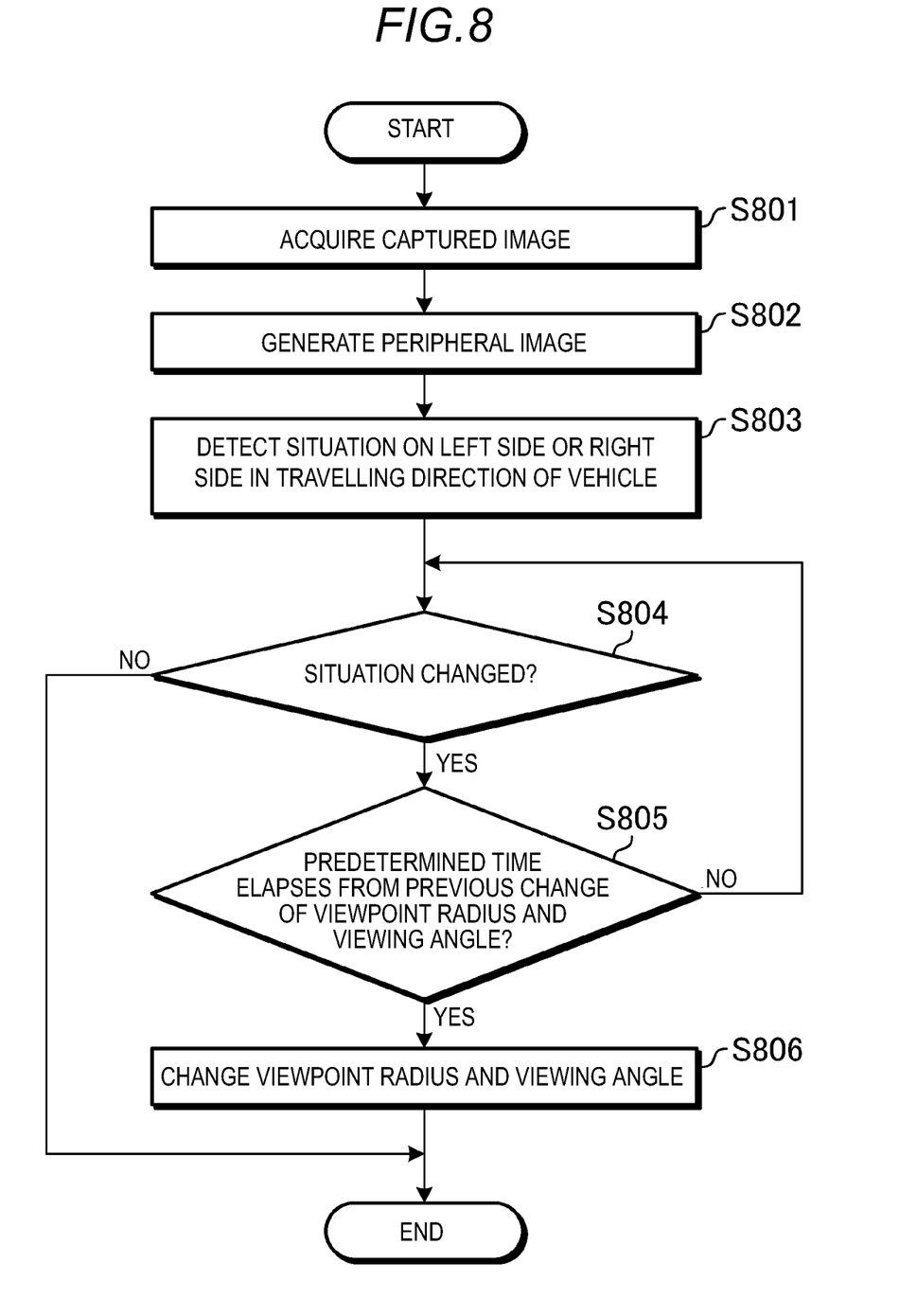
FIG. 8 is an exemplary and schematic flowchart illustrating a series of processes executed by the periphery monitoring apparatus according to the embodiment.

Based on the above configuration, the periphery monitoring apparatus 400 according to the embodiment executes a series of processes as illustrated in FIG. 8.

FIG. 8 is an exemplary and schematic flowchart illustrating a series of processes executed by the periphery monitoring apparatus 400 according to the embodiment. The series of processes illustrated in FIG. 8 is repeatedly executed in a situation where the periphery of the vehicle 1 is required to be monitored.

As illustrated in FIG. 8, in the embodiment, first, in S801, the captured image acquisition unit 401 of the periphery monitoring apparatus 400 acquires a captured image obtained by capturing an image of the situation in the periphery of the vehicle 1 from the in-vehicle camera 15.

In S802, the peripheral image generation unit 402 of the periphery monitoring apparatus 400 generates a peripheral image (a three-dimensional image) representing the virtual gaze area including the virtual gaze point viewed from the virtual viewpoint in the virtual space in which the situation in the periphery of the vehicle 1 is reflected, based on the captured image acquired in S401.

In S803, the detection processing unit 404 of the periphery monitoring apparatus 400 detects the situation on the left side or the right side in the traveling direction of the vehicle 1 based on the outputs of various sensors (see FIG. 3) mounted on the vehicle 1. For example, the detection processing unit 404 detects whether a three-dimensional object is present on the left side or the right side in the traveling direction of the vehicle 1, whether the vehicle 1 is moving, whether the steering angle of the vehicle 1 changes by a predetermined angle or more, and the like.

In S804, the change processing unit 405 of the periphery monitoring apparatus 400 determines whether the situation on the left side or the right side in the traveling direction of the vehicle 1 changes to a situation where the left-right sense of distance with respect to the vehicle 1 is to be emphasized on the peripheral image, based on a result of the detection in S803.

When it is determined in S804 that the situation on the left side or the right side in the traveling direction of the vehicle 1 does not change to the situation where the left-right sense of distance with respect to the vehicle 1 is to be emphasized on the peripheral image, it is not necessary to change the viewpoint radius and the viewing angle of the peripheral image. Therefore, in this case, the process ends.

On the other hand, when it is determined in S804 that the situation on the left side or the right side in the traveling direction of the vehicle 1 changes to the situation where the left-right sense of distance with respect to the vehicle 1 is to be emphasized on the peripheral image, a change in the viewpoint radius and the viewing angle of the peripheral image may be necessary. Therefore, in this case, the process proceeds to S805, and the change processing unit 405 determines whether a predetermined time elapses from a previous change in the viewpoint radius and the viewing angle prior to the change in the viewpoint radius and the viewing angle of the peripheral image.

When it is determined in S805 that the predetermined time elapses, the viewpoint radius and the viewing angle should be changed. Therefore, in this case, the process proceeds to S806, and the change processing unit 405 changes the viewpoint radius to be larger than a currently used viewpoint radius and changes the viewing angle to be smaller than a currently used viewing angle. Then, the process ends.

On the other hand, when it is determined in S805 that the predetermined time does not elapse, the determination in S804 is executed again.

As described above, the periphery monitoring apparatus 400 according to the embodiment includes the display processing unit 403 and the change processing unit 405. The display processing unit 403 displays, on the display 8, the peripheral image representing the virtual gaze area including the virtual gaze point viewed from the virtual viewpoint in the virtual space in which the situation in the periphery of the vehicle 1 is reflected, based on the captured image obtained by capturing an image of the periphery of the vehicle 1. The change processing unit 405 changes the viewpoint radius corresponding to the distance between the virtual gaze point and the virtual viewpoint and the viewing angle corresponding to the range of the virtual gaze area viewed from the virtual viewpoint in accordance with the change in the situation on the left side or the right side in the traveling direction of the vehicle 1.

With the above configuration, the left-right sense of distance with respect to the vehicle 1 on the peripheral image can be appropriately adjusted by changing the viewpoint radius and the viewing angle in accordance with the change in the situation on the left side or the right side in the traveling direction of the vehicle 1. Therefore, the change in the situation on the left side or the right side in the traveling direction of the vehicle 1 can be easily confirmed.

The periphery monitoring program executed by the ECU 310 according to the embodiment does not necessarily have to be stored in advance in the ROM 310b or the SSD 310d. For example, the periphery monitoring program according to the embodiment may be provided as a computer program product recorded in an installable format or an executable format on a computer-readable recording medium such as various magnetic disks such as a flexible disk (FD) or various optical disks such as a digital versatile disk (DVD).

The periphery monitoring program according to the embodiment may be provided or distributed via a network such as the Internet. That is, the periphery monitoring program according to the embodiment may be provided in a manner that the periphery monitoring program is stored in a computer connected to a network such as the Internet and is downloaded via the network.

A periphery monitoring apparatus as an example of this disclosure includes: a display processing unit configured to display, on a display, a peripheral image representing a virtual gaze area including a virtual gaze point viewed from a virtual viewpoint in a virtual space in which a situation in a periphery of a vehicle is reflected, based on a captured image acquired by capturing an image of the periphery of the vehicle; and a change processing unit configured to change a viewpoint radius corresponding to a distance between the virtual gaze point and the virtual viewpoint and a viewing angle corresponding to a range of the virtual gaze area viewed from the virtual viewpoint in accordance with a change in a situation on a left side or a right side in a traveling direction of the vehicle.

According to the periphery monitoring apparatus described above, the viewpoint radius and the viewing angle are changed in accordance with the change in the situation on the left side or the right side in the traveling direction of the vehicle, and thus a left-right sense of distance with respect to the vehicle on the peripheral image can be appropriately adjusted. Therefore, the change in the situation on the left side or the right side in the traveling direction of the vehicle can be easily confirmed.

In the periphery monitoring apparatus described above, when the situation on the left side or the right side in the traveling direction of the vehicle changes from a first situation to a second situation where a degree to which a left-right sense of distance with respect to the vehicle is to be emphasized on the peripheral image is larger than that in the first situation, the change processing unit may change the viewpoint radius to a second viewpoint radius larger than a first viewpoint radius used in the first situation, and changes the viewing angle to a second viewing angle smaller than a first viewing angle used in the first situation. With such a configuration, the viewpoint radius and the viewing angle can be appropriately changed in accordance with the situation.

In addition, in the periphery monitoring apparatus described above, when a three-dimensional object is detected on the left side or the right side in the traveling direction of the vehicle under the first situation, the change processing unit may determine that the situation on the left side or the right side in the traveling direction of the vehicle changes from the first situation to the second situation, and change the viewpoint radius and the viewing angle. With such a configuration, whether the viewpoint radius and the viewing angle should be changed can be appropriately determined in accordance with whether there is a three-dimensional object on the left side or the right side in the traveling direction of the vehicle.

In addition, in the periphery monitoring apparatus described above, when a movement of the vehicle is detected under the first situation, the change processing unit may determine that the situation on the left side or the right side in the traveling direction of the vehicle changes from the first situation to the second situation, and change the viewpoint radius and the viewing angle. With such a configuration, whether the viewpoint radius and the viewing angle should be changed can be appropriately determined in accordance with whether the vehicle is moving.

In addition, in the periphery monitoring apparatus described above, when a change in a steering angle of the vehicle equal to or larger than a predetermined value is detected under the first situation, the change processing unit may determine that the situation on the left side or the right side in the traveling direction of the vehicle changes from the first situation to the second situation, and change the viewpoint radius and the viewing angle. With such a configuration, whether the viewpoint radius and the viewing angle should be changed can be appropriately determined in accordance with whether the steering angle of the vehicle changes by a predetermined angle or more.

In addition, in the periphery monitoring apparatus described above, when the vehicle is stopped, the change processing unit may set the viewpoint radius to a third viewpoint radius equal to or smaller than the first viewpoint radius, and set the viewing angle to a third viewing angle equal to or larger than the first viewing angle. With such a configuration, the left-right sense of distance with respect to the vehicle can be prevented from being emphasized on the peripheral image in a case where the left-right sense of distance need not be emphasized.

In addition, in the periphery monitoring apparatus described above, the display processing unit may gradually change the peripheral image by animation in accordance with the change in the viewpoint radius and the viewing angle by the change processing unit. With such a configuration, the change in the peripheral image accompanying with the change in the viewpoint radius and the viewing angle can be intuitively and easily known.

In addition, in the periphery monitoring apparatus described above, the change processing unit may maintain the viewpoint radius and the viewing angle until a predetermined time elapses after the viewpoint radius and the viewing angle are changed. With such a configuration, it is possible to prevent a situation in which it is difficult to monitor the periphery due to a frequent change in the peripheral image due to a frequent change in the viewpoint radius and the viewing angle.

The embodiment of the disclosure has been described above, and the embodiment is presented as an example, and is not intended to limit the scope of the disclosure. The above novel embodiment can be implemented in various other forms, and various omissions, substitutions, and changes can be made without departing from the gist of the disclosure. The above embodiment and modifications thereof are included in the scope and gist of the disclosure, and are also included in the scope of the invention described in the claims and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A periphery monitoring apparatus comprising:
a display processor configured to display, on a display, a peripheral image representing a virtual gaze area including a virtual gaze point viewed from a virtual viewpoint in a virtual space in which a situation in a periphery of a vehicle is reflected, based on a captured image acquired by capturing an image of the periphery of the vehicle; and
a change processor configured to change a viewpoint radius corresponding to a distance between the virtual gaze point and the virtual viewpoint and a viewing angle corresponding to a range of the virtual gaze area viewed from the virtual viewpoint in accordance with a change in a situation on a left side or a right side in a traveling direction of the vehicle, wherein when the situation on the left side or the right side in the traveling direction of the vehide changes from a first situation to a second situation where a degree to which a left-right sense of distance with respect to the vehicle is to be emphasized on the peripheral image is larger than that in the first situation, the change processor changes the viewpoint radius to a second viewpoint radius larger than a first viewpoint radius used in the first situation, and changes the viewing angle to a second viewing angle smaller than a first viewing angle used in the first situation.

2. The periphery monitoring apparatus according to claim 1, wherein
when a three-dimensional object is detected on the left side or the right side in the traveling direction of the vehicle under the first situation, the change processor determines that the situation on the left side or the right side in the traveling direction of the vehicle changes from the first situation to the second situation, and changes the viewpoint radius and the viewing angle.

3. The periphery monitoring apparatus according to claim 1, wherein
when a movement of the vehicle is detected under the first situation, the change processor determines that the situation on the left side or the right side in the traveling direction of the vehicle changes from the first situation to the second situation, and changes the viewpoint radius and the viewing angle.

4. The periphery monitoring apparatus according to claim 1, wherein
when a change in a steering angle of the vehicle equal to or larger than a predetermined value is detected under the first situation, the change processor determines that the situation on the left side or the right side in the traveling direction of the vehicle changes from the first situation to the second situation, and changes the viewpoint radius and the viewing angle.

5. The periphery monitoring apparatus according to claim 1, wherein
when the vehicle is stopped, the change processor sets the viewpoint radius to a third viewpoint radius equal to or smaller than the first viewpoint radius, and sets the viewing angle to a third viewing angle equal to or larger than the first viewing angle.

6. The periphery monitoring apparatus according to claim 1, wherein
the display processor gradually changes the peripheral image by animation in accordance with the change in the viewpoint radius and the viewing angle by the change processing unit.

7. The periphery monitoring apparatus according to claim 1, wherein
the change processor maintains the viewpoint radius and the viewing angle until a predetermined time elapses after the viewpoint radius and the viewing angle are changed.

* * * * *